United States Patent
Lu et al.

(10) Patent No.: US 7,787,273 B2
(45) Date of Patent: Aug. 31, 2010

(54) INVERTER CIRCUIT WITH SWITCH CIRCUIT HAVING TWO TRANSISTORS OPERATING ALTERNATIVELY

(75) Inventors: Jian-Hui Lu, Shenzhen (CN); Tong Zhou, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 146 days.

(21) Appl. No.: 12/004,850

(22) Filed: Dec. 21, 2007

(65) Prior Publication Data

US 2008/0151587 A1   Jun. 26, 2008

(30) Foreign Application Priority Data

Dec. 22, 2006   (CN) .................. 2006 1 0157868

(51) Int. Cl.
   *H02M 7/538*   (2007.01)
(52) U.S. Cl. .................................. 363/133
(58) Field of Classification Search .......... 363/55, 363/56, 71, 75, 97
   See application file for complete search history.

(56) References Cited

U.S. PATENT DOCUMENTS

| | | | | |
|---|---|---|---|---|
| 3,265,952 | A * | 8/1966 | Cutler et al. .............. | 363/98 |
| 4,123,692 | A * | 10/1978 | Gilmore et al. ........... | 363/41 |
| 4,449,176 | A * | 5/1984 | Turnbull .................. | 363/81 |
| 4,471,422 | A * | 9/1984 | Hierholzer, Jr. .......... | 363/56.08 |
| 4,519,022 | A * | 5/1985 | Glennon .................. | 363/41 |
| 5,627,732 | A * | 5/1997 | Loh et al. ................ | 363/16 |
| 5,656,890 | A * | 8/1997 | Park ...................... | 315/1 |
| 6,239,994 | B1 * | 5/2001 | Abdoulin ................. | 363/89 |
| 6,700,803 | B2 * | 3/2004 | Krein ..................... | 363/41 |
| 7,368,880 | B2 * | 5/2008 | Lyle et al. ............... | 315/247 |
| 7,466,083 | B2 * | 12/2008 | Goto ...................... | 315/209 R |
| 7,515,441 | B2 * | 4/2009 | Kashima .................. | 363/21.01 |
| 2001/0048606 | A1 * | 12/2001 | Mallory .................. | 363/65 |
| 2003/0103361 | A1 * | 6/2003 | Krein ..................... | 363/21.1 |
| 2008/0002437 | A1 * | 1/2008 | Yan et al. ................ | 363/16 |
| 2008/0151587 | A1 * | 6/2008 | Lu et al. ................. | 363/133 |

FOREIGN PATENT DOCUMENTS

CN   1728525 A   2/2006

* cited by examiner

*Primary Examiner*—Adolf Berhane
*Assistant Examiner*—Yemane Mehari
(74) *Attorney, Agent, or Firm*—Wei Te Chung

(57) ABSTRACT

An exemplary inverter circuit (2) includes a first switch circuit (22) including a first transistor (221) and a second transistor (222); a second switch circuit (23) including a third transistor (231) and a fourth transistor (232); and a pulse width modulation circuit (21) including a first output terminal (211) and a second output terminal (212). A gate electrode of the first transistor is connected to the first output port. A gate electrode of the second transistor is connected to the second output port. A gate electrode of the third transistor is connected to the first output port. A gate electrode of the fourth transistor is connected to the second output port. A drain electrode of the third transistor is connected to a drain electrode of the first transistor, and a drain electrode of the fourth transistor is connected to a drain electrode of the second transistor.

13 Claims, 2 Drawing Sheets

INVERTER CIRCUIT WITH SWITCH CIRCUIT HAVING TWO TRANSISTORS OPERATING ALTERNATIVELY

FIELD OF THE INVENTION

The present invention relates to inverter circuits, and particularly to an inverter circuit with switch circuits, each of the switch circuits includes two transistors operating alternatively.

GENERAL BACKGROUND

In general, a liquid crystal display (LCD) device needs to have an inverter circuit installed therein, for converting an external direct current (DC) voltage into an alternating current (AC) voltage.

FIG. 2 is a circuit diagram of a conventional inverter circuit. The inverter circuit 1 includes a DC input terminal 10 connected to a DC power supply (not shown), a pulse width modulation (PWM) circuit 11, a first switch circuit 12, a second switch circuit 13, a first filter circuit 141, a second filter circuit 142, a first transformer 15, and a second transformer 16.

The PWM circuit 11 includes a first output port 111 and a second output port 112. The first output port 111 is used to output a first square wave signal, and the second output port 112 is used to output a second square wave signal. Phases of the two square wave signals are opposite.

The first switch circuit 12 includes a first transistor 121 and a second transistor 122. The transistors 121 and 122 are N-channel metal-oxide-semiconductor field-effect transistors (NMOSFETs). A gate electrode of the first transistor 121 is connected to the first output port 111, and a source electrode of the first transistor 121 is connected to ground. A gate electrode of the second transistor 122 is connected to the first output port 111, and a source electrode of the second transistor 122 is connected to ground. A drain electrode of the second transistor 122 is connected to a drain electrode of the first transistor 121. In practice, the first switch circuit 12 is installed in a first chip (not shown).

The second switch circuit 13 includes a third transistor 131 and a fourth transistor 132. The transistors 131 and 132 are NMOSFETs. A gate electrode of the third transistor 131 is connected to the second output port 112, and a source electrode of the third transistor 131 is connected to ground. A gate electrode of the fourth transistor 132 is connected to the second output port 112, and a source electrode of the fourth transistor 132 is connected to ground. A drain electrode of the fourth transistor 132 is connected to a drain electrode of the third transistor 131. In practice, the second switch circuit 13 is installed in a second chip (not shown).

Each filter circuit 141 or 142 includes a resistor (not labeled) and a capacitor (not labeled). The resistor and the capacitor are connected in series.

The first transformer 15 includes a first primary winding 151, a second primary winding 152, and a first secondary winding 154. The first primary winding 151 and the second primary winding 152 share a first tap 153. The first tap 153 is connected to the DC input terminal 10. The first tap 153 is connected to ground via the first filter circuit 141. The other tap (not labeled) of the first primary winding 151 of the first transformer 15 is connected to the drain electrode of the first transistor 121. The other tap (not labeled) of the second primary winding 152 of the first transformer 15 is connected to a drain electrode of the third transistor 131. Two taps of the first secondary winding 154 are connected to a first load (not shown). The first load may for example be lamps.

The second transformer 16 includes a third primary winding 161, a fourth primary winding 162, and a second secondary winding 164. The third primary winding 161 and the fourth primary winding 162 share a second tap 163. The second tap 163 is connected to the DC input terminal 10. The second tap 163 is connected to ground via the second filter circuit 142. The other tap (not labeled) of the third primary winding 161 of the second transformer 16 is connected to the drain electrode of the first transistor 121. The other tap (not labeled) of the fourth primary winding 162 of the second transformer 16 is connected to the drain electrode of the third transistor 131. Two taps (not labeled) of the second secondary winding 164 are connected to a second load (not shown). The second load may for example be lamps.

When the first square wave signal is a high level and the second square wave signal is a low level, the first transistor 121 and the second transistor 122 are turned on and the third transistor 131 and the fourth transistor 132 are turned off. The first primary winding 151 and the third primary winding 161 cooperatively form a first parallel circuit (not labeled). The first transistor 121 and the second transistor 122 cooperatively form a second parallel circuit (not labeled). A first current path is formed sequentially through the DC input terminal 10, the first parallel circuit, the second parallel circuit, and ground. A first current is formed when the DC power supply provided to the DC input terminal 10 is connected to ground via the first current path. The first current is divided into two parts flowing through the first primary winding 151 and the third primary winding 161 respectively. The first current is also divided into two parts flowing through the first transistor 121 and the second transistor 122 respectively. A direction of the first current flowing through the first winding 151 is from bottom to top, thus a direction of an inducted current flowing through the first winding 151 is from top to bottom. An inducted current correspondingly generated in the first secondary winding 154 and a direction of the inducted current flowing through the first secondary winding 154 is from top to bottom. A direction of the first current flowing through the third winding 161 is from bottom to top, thus a direction of an inducted current flowing through the third winding 161 is from top to bottom. An inducted current correspondingly generated in the second secondary winding 164 and a direction of the inducted current flowing through the second secondary winding 164 is from top to bottom.

When the first square wave signal is a low level and the second square wave signal is a high level, the first transistor 121 and the second transistor 122 are turned off and the third transistor 131 and the fourth transistor 132 are turned on. The second primary winding 152 and the fourth primary winding 162 cooperatively form a third parallel circuit (not labeled). The third transistor 131 and the fourth transistor 132 cooperatively form a fourth parallel circuit (not labeled). A second current path is formed sequentially through the DC input terminal 10, the third parallel circuit, the fourth parallel circuit, and ground. A second current is formed when the DC power supply provided to the DC input terminal 10 is connected to ground via the second current path. The second current is divided into two parts flowing through the second primary winding 152 and the fourth primary winding 162 respectively. The second current is also divided into two parts flowing through the third transistor 131 and the fourth transistor 132 respectively. A direction of the second current flowing through the second primary winding 152 is from top to bottom, thus a direction of an inducted current flowing through the second primary winding 152 is from bottom to top. The inducted current correspondingly generated in the first secondary winding 154 and the direction of the inducted current flowing through the first secondary winding 154 is from bottom to top. A direction of the second current flowing through the fourth primary winding 162 is from top to bottom, thus a direction of an inducted current flowing through the fourth primary winding 162 is from bottom to top. The inducted current correspondingly generated in the second secondary winding 164 and the direction of the inducted current flowing through the second secondary winding 164 is from bottom to top.

Then the inverter circuit 1 repeats the above process. Because the direction of the inducted current flowing through the first secondary winding 154 changes periodically, a first AC voltage is generated between the two taps of the first secondary winding 154. The first AC voltage is used for driving the first load. Because the direction of the inducted current flowing through the second secondary winding 164 changes periodically, a second AC voltage is generated between the two taps of the second secondary winding 164. The second AC voltage is used for driving the second load.

When one of the transistors 121, 122, 131, 132 is turned on, the corresponding transistor 121, 122, 131, 132 has a saturation resistance. Heat is correspondingly generated in the corresponding transistor 121, 122, 131, 132 when the current flows through one of the transistors 121, 122, 131, 132. According to the above description, the first transistor 121 and the second transistor 122 are turned on or turned off simultaneously and the third transistor 131 and the fourth transistor 132 are turned on or turned off simultaneously. When the first transistor 121 and the second transistor 122 are turned on simultaneously, a great deal of heat is generated in the first chip. When the third transistor 131 and the fourth transistor 132 are turned on simultaneously, a great deal of heat is generated in the second chip. When the inverter circuit 1 operates for a long time, the heat generated in the first chip or in the second chip can not dissipate quickly and accumulates in the first chip or in the second chip. Thus, the first switch circuit 12 or the second switch circuit 13 may be impaired or even damaged, the first chip or the second chip are liable to be burned out.

It is desired to provide a new inverter circuit which can overcome the above-described deficiencies.

SUMMARY

In one preferred embodiment, an inverter circuit includes: a direct current input terminal connected to a direct current power supply; a first transformer including a first primary winding, a second primary winding, and a secondary winding for outputting an alternating current voltage; a second transformer including a first primary winding, a second primary winding, and a secondary winding for outputting an alternating current voltage; a pulse width modulation circuit including a first output terminal and a second output terminal; a first switch circuit including a first transistor and a second transistor; and a second switch circuit including a third transistor and a fourth transistor. A gate electrode of the first transistor is connected to the first output port, and a source electrode of the first transistor is connected to ground. A gate electrode of the second transistor is connected to the second output port, and a source electrode of the second transistor is connected to ground. A gate electrode of the third transistor is connected to the first output port, and a source electrode of the third transistor is connected to ground. A gate electrode of the fourth transistor is connected to the second output port, and a source electrode of the fourth transistor is connected to ground. A drain electrode of the third transistor is connected to a drain electrode of the first transistor, and a drain electrode of the fourth transistor is connected to a drain electrode of the second transistor. The first primary winding and the second primary winding share a first tap, the first tap is connected to the direct current input terminal, the other tap of the first primary winding is connected to the drain electrode of the first transistor, the other tap of the second primary winding is connected to the drain electrode of the second transistor. The third primary winding and the fourth primary winding share a second tap, the second tap is connected to the direct current input terminal, the other tap of the third primary winding is connected to the drain electrode of the first transistor, the other tap of the third primary winding is connected to the drain electrode of the second transistor.

In another preferred embodiment, an inverter circuit includes: a direct current input terminal connected to a direct current power supply; a first transformer including a first primary winding, a second primary winding, and a secondary winding for outputting an alternating current voltage; a second transformer including a first primary winding, a second primary winding, and a secondary winding for outputting an alternating current voltage; a first switch circuit including a first transistor and a second transistor; a second switch circuit including a third transistor and a fourth transistor; a pulse width modulation circuit configured for outputting a first square wave signal to turn on or turn off the first transistor and the third transistor and a second square wave signal to turn on or turn off the second transistor and the fourth transistor. Phases of the first square wave signal and the second square wave signal are opposite. When the first square wave signal is a high level and the second square wave signal is a low level, a first current path is formed sequentially through the direct current input terminal, a first parallel circuit formed by the first primary winding and the third primary winding, a second parallel circuit formed by the first transistor and the third transistor, and ground. When the first square wave signal is a low level and the second square wave signal is a high level, a second current path is formed sequentially through the direct current input terminal, a third parallel circuit formed by the second primary winding and the fourth primary winding, a fourth parallel circuit formed by the second transistor and the fourth transistor, and ground.

Other novel features and advantages of the inverter circuit will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail.

Figure 1:
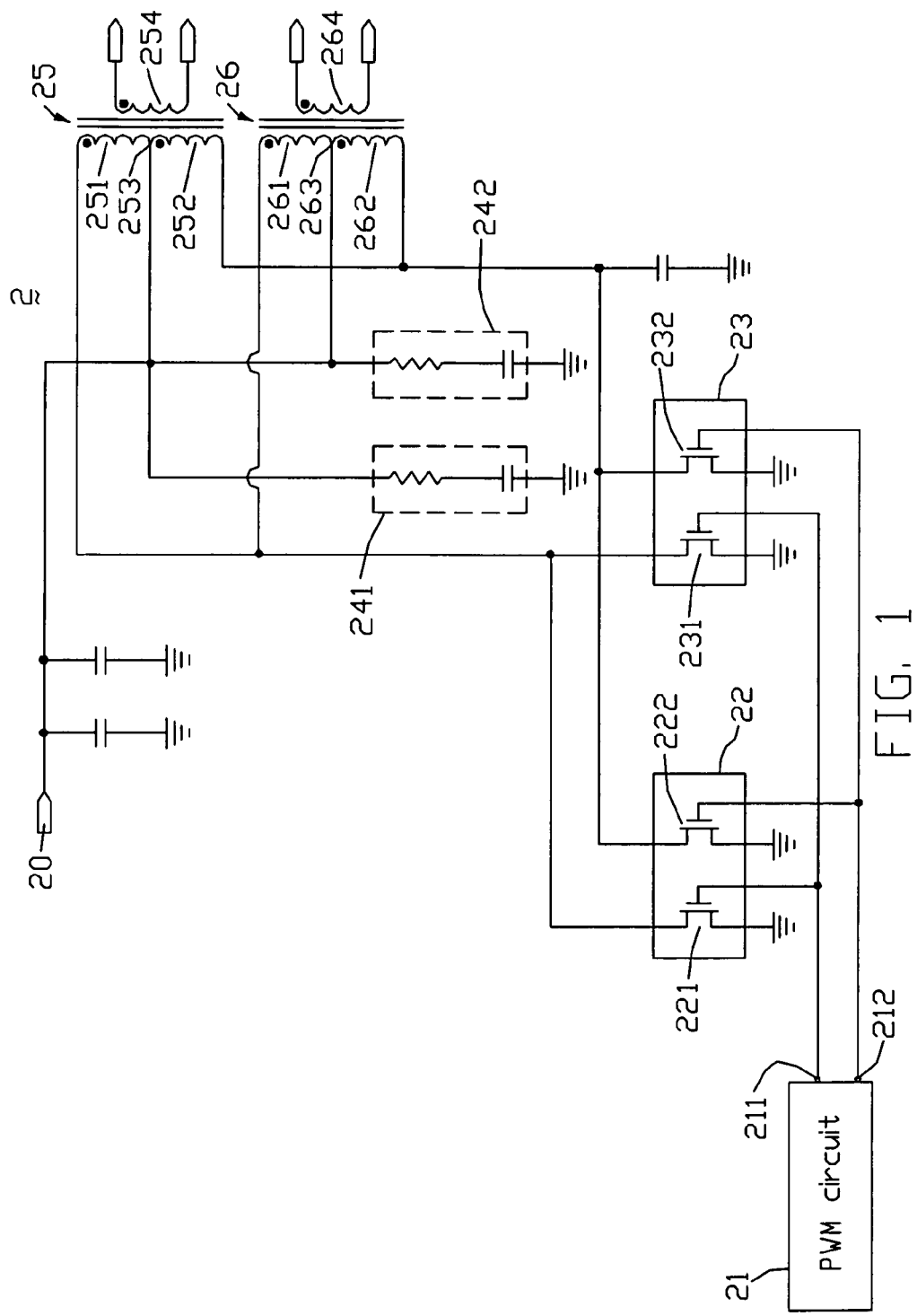
FIG. 1 is a circuit diagram of an inverter circuit of the present invention.
Figure 2:
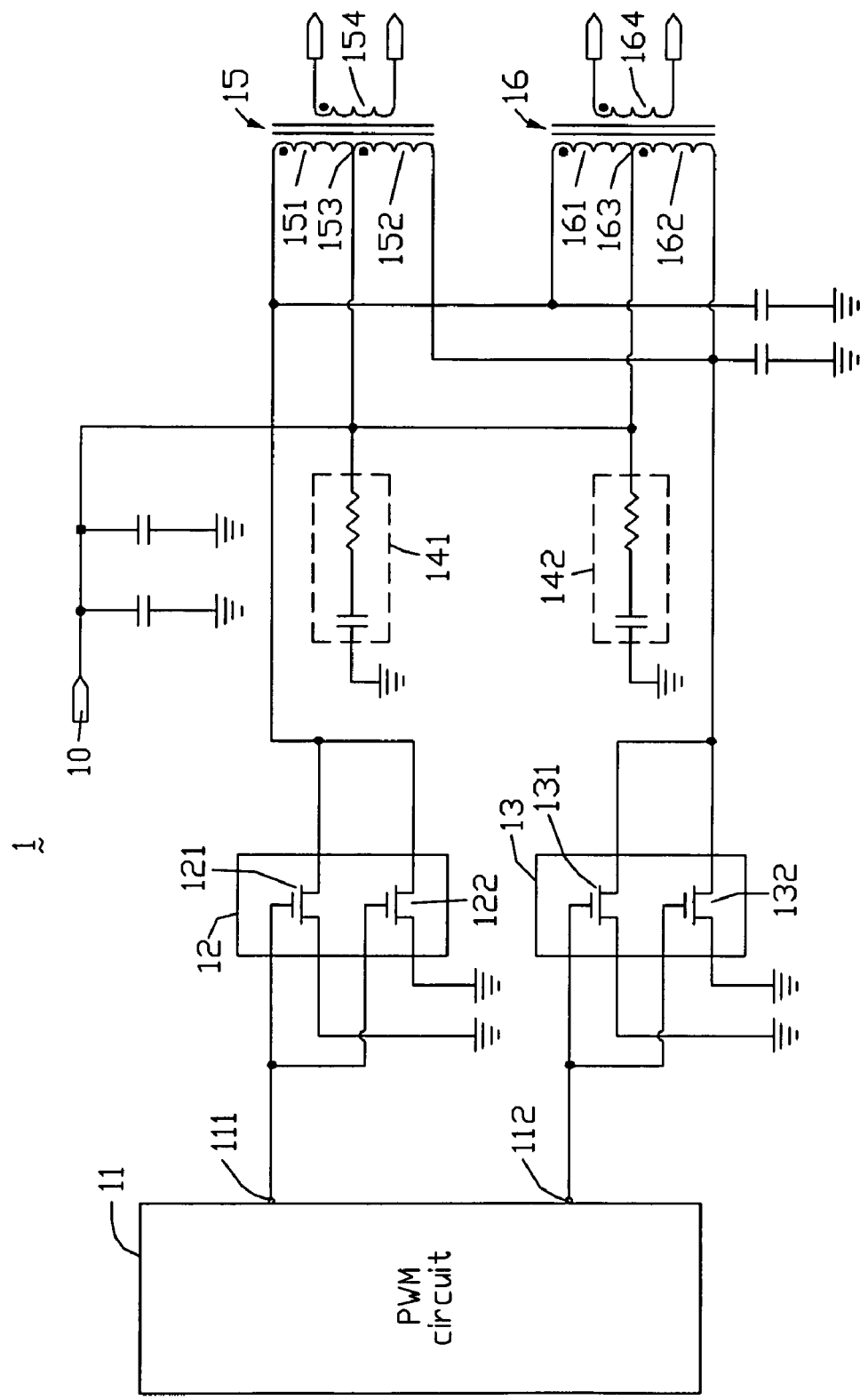
FIG. 2 is a circuit diagram of a conventional inverter circuit.

FIG. 1 is a circuit diagram of an inverter circuit of the present invention. The inverter circuit 2 includes a DC input terminal 20 connected to a DC power supply (not shown), a PWM circuit 21, a first switch circuit 22, a second switch circuit 23, a first filter circuit 241, a second filter circuit 242, a first transformer 25, and a second transformer 26. The DC input terminal 20 is connected to ground via a capacitor (not labeled).

The PWM circuit 21 includes a first output port 211 and a second output port 212. The first output port 211 is used to output a first square wave signal, and the second output port 212 is used to output a second square wave signal. Phases of the two square wave signals are opposite.

The first switch circuit 22 includes a first transistor 221 and a second transistor 222. The transistors 221 and 222 are NMOSFETs. A gate electrode of the first transistor 221 is connected to the first output port 211, and a source electrode of the first transistor 221 is connected to ground. A gate electrode of the second transistor 222 is connected to the second output port 212, and a source electrode of the second transistor 222 is connected to ground. In practice, the first switch circuit 22 is installed in a first chip (not shown).

The second switch circuit 23 includes a third transistor 231 and a fourth transistor 232. The transistors 231 and 232 are NMOSFETs. A gate electrode of the third transistor 231 is connected to the first output port 211, and a source electrode of the third transistor 231 is connected to ground. A gate electrode of the fourth transistor 232 is connected to the second output port 212, and a source electrode of the fourth transistor 232 is connected to ground. A drain electrode of the third transistor 231 is connected to a drain electrode of the first transistor 221. A drain electrode of the fourth transistor 232 is connected to a drain electrode of the second transistor 222. The drain electrode of the fourth transistor 232 is connected to ground via a capacitor (not labeled). In practice, the second switch circuit 23 is installed in a second chip (not shown).

Each filter circuit 241 or 242 includes a resistor (not labeled) and a capacitor (not labeled). The resistor and the capacitor are connected in series.

The first transformer 25 includes a first primary winding 251, a second primary winding 252, and a first secondary winding 254. The first primary winding 251 and the second primary winding 252 share a first tap 253. The first tap 253 is connected to the DC input terminal 20. The first tap 253 is connected to ground via the first filter circuit 241. The other tap (not labeled) of the first primary winding 251 of the first transformer 25 is connected to the drain electrode of the first transistor 221. The other tap (not labeled) of the second primary winding 252 of the first transformer 25 is connected to the drain electrode of the second transistor 222. Two taps of the first secondary winding 254 are connected to a first load (not shown). The first load may for example be lamps.

The second transformer 26 includes a third primary winding 261, a fourth primary winding 262, and a second secondary winding 264. The third primary winding 261 and the fourth primary winding 262 share a second tap 263. The second tap 263 is connected to the DC input terminal 20. The second tap 263 is connected to ground via the second filter circuits 242. The other tap (not labeled) of the third primary winding 261 of the second transformer 26 is connected to the drain electrode of the first transistor 221. The other tap (not labeled) of the fourth primary winding 262 of the fourth transformer 26 is connected to the drain electrode of the second transistor 222. Two taps (not labeled) of the second secondary winding 264 are connected to a second load (not shown). The second load may for example be lamps.

When the first square wave signal is a high level and the second square wave signal is a low level, the first transistor 221 and the third transistor 231 are turned on and the second transistor 222 and the fourth transistor 232 are turned off. The first primary winding 251 and the third primary winding 261 cooperatively form a first parallel circuit (not labeled). The first transistor 221 and the third transistor 231 cooperatively form a second parallel circuit (not labeled). A first current path is formed sequentially through the DC input terminal 20, the first parallel circuit, the second parallel circuit, and ground. A first current is formed when the DC power supply provided to the DC input terminal 20 is connected to ground via the first current path. The first current is divided into two parts flowing through the first primary winding 251 and the third primary winding 261 respectively. The first current is also divided into two parts flowing through the first transistor 221 and the third transistor 231 respectively. A direction of the first current flowing through the first primary winding 251 is from bottom to top, thus a direction of an inducted current flowing through the first primary winding 251 is from top to bottom. An inducted current correspondingly generated in the first secondary winding 254 and a direction of the inducted current flowing through the first secondary winding 254 is from top to bottom. A direction of the first current flowing through the third primary winding 261 is from bottom to top, thus a direction of an inducted current flowing through the third primary winding 261 is from top to bottom. An inducted current correspondingly generated in the second secondary winding 264 and a direction of the inducted current flowing through the second secondary winding 264 is from top to bottom.

When the first square wave signal is a low level and the second square wave signal is a high level, the first transistor 221 and the third transistor 231 are turned off and the second transistor 222 and the fourth transistor 232 are turned on. The second primary winding 252 and the fourth primary winding 262 cooperatively form a third parallel circuit (not labeled). The second transistor 222 and the fourth transistor 232 cooperatively form a fourth parallel circuit (not labeled). A second current path is formed sequentially through the DC input terminal 20, the third parallel circuit, the fourth parallel circuit, and ground. A second current is formed when the DC power supply provided to the DC input terminal 20 is connected to ground via the second current path. The second current is divided into two parts flowing through the second primary winding 252 and the fourth primary winding 262 respectively. The second current is also divided into two parts flowing through the second transistor 222 and the fourth transistor 232 respectively. A direction of the second current flowing through the second primary winding 252 is from top to bottom, thus a direction of an inducted current flowing through the second primary winding 252 is from bottom to top. The inducted current correspondingly generated in the first secondary winding 254 and the direction of the inducted current flowing through the first secondary winding 254 is from bottom to top. A direction of the second current flowing through the fourth primary winding 262 is from top to bottom, thus a direction of an inducted current flowing through the fourth primary winding 262 is from bottom to top. The inducted current correspondingly generated in the second secondary winding 264 and the direction of the inducted current flowing through the second secondary winding 264 is from bottom to top.

Then the inverter circuit 2 repeats the above process. Because the direction of the inducted current flowing through the first secondary winding 254 changes periodically, a first AC voltage is generated between the two taps of the first secondary winding 254. The first AC voltage is used for driving the first load. Because the direction of the inducted current flowing through the second secondary winding 264 changes periodically, a second AC voltage is generated between two taps (not labeled) of the second secondary winding 264. The second AC voltage is used for driving the second load.

When one of the transistors 221, 222, 231, 232 is turned on, the corresponding transistor 221, 222, 231, 232 has a saturation resistance. Heat is correspondingly generated in the corresponding transistor 221, 222, 231, 232 when the current flows through one of the transistors 221, 222, 231, 232. According to the above description, when the first transistor 221 is turned on the second transistor 222 is turned off, and when the first transistor 221 is turned off the second transistor 222 is turned on. That is, only one transistor is operated in the first chip in any time. Heat accumulated in the first chip effectively decreases, and heat emission efficiency is correspondingly enhanced. When the third transistor 231 is turned on the fourth transistor 232 is turned off, and when the third transistor 231 is turned off the fourth transistor 232 is turned on. That is, only one transistor is operated in the second chip in any time. Heat accumulated in the second chip effectively decreases, and heat emission efficiency is correspondingly enhanced.

In short, heat accumulated in the first chip and the second chip effectively decrease respectively, and heat emission efficiencies of the first chip and the second chip are correspondingly enhanced. Thus, a risk of the first switch circuit 22 and the second switch circuit 23 being impaired is effectively reduced or even eliminated. A risk of the first chip and the second chip being burned out is correspondingly effectively reduced or even eliminated.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. An inverter circuit, comprising:
   a direct current input terminal connected to a direct current power supply;
   a first transformer comprising a first primary winding, a second primary winding, and a secondary winding configured for outputting an alternating current voltage;
   a second transformer comprising a third primary winding, a fourth primary winding, and a secondary winding configured for outputting an alternating current voltage;
   a pulse width modulation circuit comprising a first output terminal to output a first square wave signal and a second output terminal to output a second square wave signal with an inverse phase relative to the first square wave signal;
   a first switch circuit comprising a first transistor and a second transistor; and
   a second switch circuit comprising a third transistor and a fourth transistor;
   wherein a gate electrode of the first transistor is connected to the first output terminal, and a source electrode of the first transistor is connected to ground;
   a gate electrode of the second transistor is connected to the second output terminal, and a source electrode of the second transistor is connected to ground;
   a gate electrode of the third transistor is connected to the first output terminal, and a source electrode of the third transistor is connected to ground;
   a gate electrode of the fourth transistor is connected to the second output terminal, and a source electrode of the fourth transistor is connected to ground;
   a drain electrode of the third transistor is connected to a drain electrode of the first transistor, and a drain electrode of the fourth transistor is connected to a drain electrode of the second transistor;
   the first primary winding and the second primary winding share a first tap, the first tap is connected to the direct current input terminal, the other tap of the first primary winding is connected to the drain electrode of the first transistor, and the other tap of the second primary winding is connected to the drain electrode of the second transistor; and
   the third primary winding and the fourth primary winding share a second tap, the second tap is connected to the direct current input terminal, the other tap of the third primary winding is connected to the drain electrode of the first transistor, and the other tap of the third primary winding is connected to the drain electrode of the second transistor.

2. The inverter circuit as claimed in claim 1, further comprising a first filter circuit and a second filter circuit, wherein the first filter circuit is connected between the first tap and ground, and the second filter circuit is connected between the second tap and ground.

3. The inverter circuit as claimed in claim 1, wherein the first switch circuit is installed in a first chip and the second switch circuit is installed in a second chip.

4. The inverter circuit as claimed in claim 1, wherein the first transistor, the second transistor, the third transistor, and the fourth transistor are N-channel metal-oxide-semiconductor field-effect transistors.

5. The inverter circuit as claimed in claim 2, wherein each filter circuit comprises a resistor and a capacitor connected in series.

6. The inverter circuit as claimed in claim 5, wherein the direct current input terminal is connected to ground via a capacitor.

7. The inverter circuit as claimed in claim 6, wherein the drain electrode of the fourth transistor is connected to ground via a capacitor.

8. An inverter circuit, comprising:
   a direct current input terminal connected to a direct current power supply;
   a first switch circuit comprising a first transistor and a second transistor;
   a second switch circuit comprising a third transistor and a fourth transistor, wherein source electrodes of the first, second, third and fourth transistors are grounded, a drain electrode of the third transistor is connected to a drain electrode of the first transistor, and a drain electrode of the fourth transistor is connected to a drain electrode of the second transistor;
   a first transformer comprising a first primary winding, a second primary winding, and a secondary winding configured for outputting an alternating current voltage, wherein the first primary winding and the second primary winding share a first tap, the first tap is connected to the direct current input terminal, the other tap of the first primary winding is connected to the drain electrode of the first transistor, and the other tap of the second primary winding is connected to the drain electrode of the second transistor;
   a first filter circuit connected between the first tap and ground;
   a second transformer comprising a third primary winding, a fourth primary winding, and a secondary winding configured for outputting an alternating current voltage, wherein the third primary winding and the fourth primary winding share a second tap, the second tap is connected to the direct current input terminal, the other tap of the third primary winding is connected to the drain electrode of the first transistor, and the other tap of the fourth primary winding is connected to the drain electrode of the second transistor;

a second filter circuit connected between the second tap and ground; and a pulse width modulation circuit comprising a first output port configured for outputting a first square wave signal to turn on or turn off the first transistor and the third transistor and a second output port configured for outputting a second square wave signal to turn on or turn off the second transistor and the fourth transistor, wherein gate electrodes of the first and the third transistors are connected to the first output port, and gate electrodes of the second and the fourth transistors are connected to the second output port;

wherein phases of the first square wave signal and the second square wave signal are opposite;

when the first square wave signal is a high level and the second square wave signal is a low level, a first current path is formed sequentially through the direct current input terminal, a first parallel circuit formed by the first primary winding and the third primary winding, a second parallel circuit formed by the first transistor and the third transistor, and ground; and when the first square wave signal is a low level and the second square wave signal is a high level, a second current path is formed sequentially through the direct current input terminal, a third parallel circuit formed by the second primary winding and the fourth primary winding, a fourth parallel circuit formed by the second transistor and the fourth transistor, and ground.

9. The inverter circuit as claimed in claim 8, wherein each of the first and second filter circuits comprises a resistor and a capacitor connected in series.

10. The inverter circuit as claimed in claim 8, wherein the first switch circuit is installed in a first chip and the second switch circuit is installed in a second chip.

11. The inverter circuit as claimed in claim 8, wherein the first transistor, the second transistor, the third transistor, and the fourth transistor are N-channel metal-oxide-semiconductor field-effect transistors.

12. The inverter circuit as claimed in claim 9, wherein the direct current input terminal is connected to ground via a capacitor.

13. The inverter circuit as claimed in claim 12, wherein the drain electrode of the fourth transistor is connected to ground via a capacitor.

* * * * *